US010552511B2

(12) United States Patent
Shastri et al.

(10) Patent No.: US 10,552,511 B2
(45) Date of Patent: Feb. 4, 2020

(54) SYSTEMS AND METHODS FOR DATA-DRIVEN ANOMALY DETECTION

(71) Applicant: Infosys Limited, Bangalore (IN)

(72) Inventors: Lokendra Shastri, Bhopal (IN); K. Antony Arokia Durai Raj, Pollachi (IN); Balasubramanian Kanagasabapathi, Erode (IN)

(73) Assignee: Infosys Limited, Bangalore (IN)

( * ) Notice: Subject to any disclaimer, the term of this patent is extended or adjusted under 35 U.S.C. 154(b) by 888 days.

(21) Appl. No.: 14/220,050

(22) Filed: Mar. 19, 2014

(65) Prior Publication Data
US 2014/0379301 A1    Dec. 25, 2014

(30) Foreign Application Priority Data

Jun. 24, 2013   (IN) ............................ 2720/CHE/2013

(51) Int. Cl.
*G06F 17/18*   (2006.01)
(52) U.S. Cl.
CPC .................................. *G06F 17/18* (2013.01)
(58) Field of Classification Search
CPC . G06F 17/18; G05B 23/0224; G05B 23/0024; G06K 9/6284
USPC ......... 702/183; 382/103, 124, 128, 195, 242
See application file for complete search history.

(56) References Cited

U.S. PATENT DOCUMENTS

| | | | |
|---|---|---|---|
| 5,566,092 A * | 10/1996 | Wang ................. | G05B 19/4184 700/159 |
| 7,561,991 B2 | 7/2009 | Matsunaga et al. | |
| 8,588,484 B2 * | 11/2013 | Wang ..................... | G06K 9/001 382/115 |
| 8,626,889 B2 | 1/2014 | Sharma et al. | |
| 2007/0289013 A1 | 12/2007 | Lim | |

(Continued)

FOREIGN PATENT DOCUMENTS

| CN | 101946238 | 1/2011 |
|---|---|---|
| WO | WO 2010111748 | 10/2010 |

OTHER PUBLICATIONS

Downey, "A novel changepoint detection algorithm", arXiv.org, 2008.*

(Continued)

*Primary Examiner* — Mohamed Charioui
*Assistant Examiner* — Catherine T. Rastovski
(74) *Attorney, Agent, or Firm* — Klarquist Sparkman, LLP (57) ABSTRACT

The technique relates to a system and method for data-driven anomaly detection. This technique involves identifying region of interest from the data based on dimensionality reduction technique and change point detection algorithm. A reference data can be obtained separately or can be obtained from the test data also, wherein the reference data represent the normal operating condition of a system. The reference data are classified into different groups representing different modes of operation of the system. A control limit is determined for the different groups. The data within the region of interest are mapped with the different groups of the reference data and it is determined if the mapped data fall outside of the control limit of the mapped group. Finally, at least one abnormal event is detected by applying a heuristic algorithm on the data within the region of interest which are outside the control limit.

20 Claims, 6 Drawing Sheets

(56) References Cited

U.S. PATENT DOCUMENTS

| | | | |
|---|---|---|---|
| 2008/0168339 A1 | 7/2008 | Hudson et al. | |
| 2009/0002148 A1* | 1/2009 | Horvitz | G06Q 10/047 340/514 |
| 2010/0299118 A1 | 11/2010 | Sharma et al. | |
| 2012/0063641 A1* | 3/2012 | Venkatesh | G06K 9/00771 382/103 |
| 2014/0032506 A1* | 1/2014 | Hoey | G06F 17/30303 707/691 |

OTHER PUBLICATIONS

Mujica et al., "Q-statistic and T2-statistic PCA-based measures for damage assessment in structures", SHM 10(5) 2010, 539-533.*

Hotelling's T-squared distribution, https://en.wikipedia.org/wiki/Hotelling%27s_T-squared_distribution, accessed Mar. 13, 2019.*

"Non-linear dimensionality reduction techniques for unsupervised feature extraction" S. De Backer, A. Naud, P. Scheunders )Vision Lab, Department of Physics, University of Antwerp, revised Jan. 30, 1998.*

Mujica et al., "Q-statistic and T2-statistic PCA-based measures for damage assessment in structures", Structural Health Monitoring (2010).*

A novel changepoint detection algorithm, Allen B. Downey, Dec. 5, 2008.*

Yao et al., "Online Anomaly Detection for Sensor Systems: a Simple and Efficient Approach," Performance Evaluation, vol. 67, Issue 11, Nov. 2010, pp. 1059-1075.

Siripanodorn et al., "Anomaly Detection in Wireless Sensor Networks using Self-Organizing Map and Wavelets," International Journal of Communications, vol. 4, Issue 3, 2010, 10 pages.

Das et al., "Detecting Anomalous Records in Categorical Datasets,"*KDD '07*, Aug. 12-15, 2007, San Jose, CA, 10 pages.

* cited by examiner

SYSTEMS AND METHODS FOR DATA-DRIVEN ANOMALY DETECTION

FIELD

The present disclosure relates generally to anomaly detection, and in particular, to a system and method for detecting at least one abnormal event in a system from data associated with functioning of the system.

BACKGROUND

Most industrial systems are automated in order to operate efficiently. Monitoring the state of the system in real-time is essential for smooth functioning of automated systems. This monitoring function can be done manually, or multiple sensors may be employed to record reading about the state of the system at various instances of time, which results in a very large amount of data. These sensor readings or manually monitored readings are analyzed to detect anomalies in the system. At present, the data analysis is carried out either manually or semi-automatically. An anomaly is detected by using a probability model, three sigma models, regression models, time series models, covariance matrix and QR decomposition method. But there are limitations of using these models. The existing methods use only statistical methods to detect anomalies, which may report large number of false positives. The existing methods are developed mostly considering real value sensor reading and not for other data types (e.g. categorical).

SUMMARY

The present technique can overcome the limitations mentioned above by using statistical models, data mining techniques and heuristic search methods to detect anomalies in a system. This technique is automatic and can be used to monitor the automated system in real time and it reduces the number of false positives.

According to an embodiment, a method for data-driven anomaly detection is disclosed. The method includes identifying a region of interest from the data based on dimensionality reduction technique and change point detection algorithm. The data within the region of interest is mapped with one or more predefined groups of reference data representing one or more modes of operation of a system, wherein the reference data represent normal operating condition of the system. Thereafter, it is determined if the data within the region of interest is outside of a predefined control limit of the corresponding mapped group of the one or more predefined groups. Finally, at least one abnormal event is detected by applying a heuristic algorithm on the data within the region of interest which are outside the control limit. In an alternate embodiment, the method includes identifying a region of interest from the data based on dimensionality reduction technique and change point detection algorithm. Reference data are classified into one or more groups representing one or more modes of operation of a system, wherein the reference data is obtained from a region outside the region of interest. A control limit is determined for each of the one or more groups by analyzing the reference data. The data within the region of interest are mapped with the one or more groups. Then, it is determined if the data within the region of interest is outside the control limit of the mapped group of the one or more predefined groups. Finally, at least one abnormal event is detected by applying a heuristic algorithm on the data within the region of interest which are outside the control limit.

In an additional embodiment, a system for data-driven anomaly detection is disclosed. The system includes a region of interest identification module, a mapping module, a data analysis module and an abnormal event detection module. The region of interest identification module is configured to identify a region of interest from the data based on dimensionality reduction technique and change point detection algorithm. The mapping module is configured to map the data within the region of interest with one or more predefined groups of reference data representing one or more modes of operation of the system, wherein the reference data represent normal operating condition of a system. The data analysis module is configured to determine whether the data within the region of interest is outside of a predefined control limit of the corresponding mapped group of the one or more predefined groups and the abnormal event detection module is configured to detect at least one abnormal event by applying a heuristic algorithm on the data within the region of interest which are outside the control limit. In an alternate embodiment, the system includes a region of interest identification module, a reference data classification module, a control limit determination module, a mapping module, a data analysis module and an abnormal event detection module. The region of interest identification module is configured to identify a region of interest from the data based on dimensionality reduction technique and change point detection algorithm. The reference data classification module is configured to classify reference data into one or more groups representing one or more modes of operation of a system, wherein the reference data is obtained from a region outside the region of interest. The control limit determination module is configured to determine a control limit for each of the one or more groups by analyzing the reference data. The mapping module is configured to map the data within the region of interest with the one or more groups. The data analysis module is configured to determine whether the data within the region of interest is outside the control limit of the mapped group of the one or more predefined groups and the abnormal event detection module is configured to detect at least one abnormal event by applying a heuristic algorithm on the data within the region of interest which are outside the control limit.

In another embodiment, a computer-readable storage medium for data-driven anomaly detection is disclosed. The computer-readable storage medium which is not a signal stores computer executable instructions for identifying a region of interest from the data based on dimensionality reduction technique and change point detection algorithm, mapping the data within the region of interest with one or more predefined groups of reference data representing one or more modes of operation of a system, wherein the reference data represent normal operating condition of the system, determining whether the data within the region of interest is outside of a predefined control limit of the corresponding mapped group of the one or more predefined groups and detecting at least one abnormal event by applying a heuristic algorithm on the data within the region of interest which are outside the control limit. In an alternate embodiment, the computer-readable storage medium which is not a signal stores computer executable instructions for identifying a region of interest from the data based on dimensionality reduction technique and change point detection algorithm, classifying reference data into one or more groups representing one or more modes of operation of a system, wherein the reference data is obtained from a region outside the region of interest, determining a control limit for each of the one or more groups by analyzing the reference data, mapping the data within the region of interest with the one or more groups, determining whether the data within the region of interest is outside the control limit of the mapped group of the one or more predefined groups and detecting at least one abnormal event by applying a heuristic algorithm on the data within the region of interest which are outside the control limit.

DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a system and method for data-driven anomaly detection. This involves identifying a region of interest in the data based on dimensionality reduction technique and change point detection algorithm. If no reference data is available, wherein the reference data represent normal operating condition of a system, then the reference data is obtained from the test data itself. In this case, the region outside the region of interest acts as the reference data. The data within the region of interest are mapped with one or more groups of reference data, wherein the one or more groups represent one or more modes of operation of the system. Each of the one or more groups has a control limit defined. If it is determined that the data within the region of interest is outside of the control limit of the corresponding mapped group then it indicates the anomaly. The abnormal event is then detected by applying a heuristic algorithm on the data within the region of interest which are outside the control limit.

Figure 1:
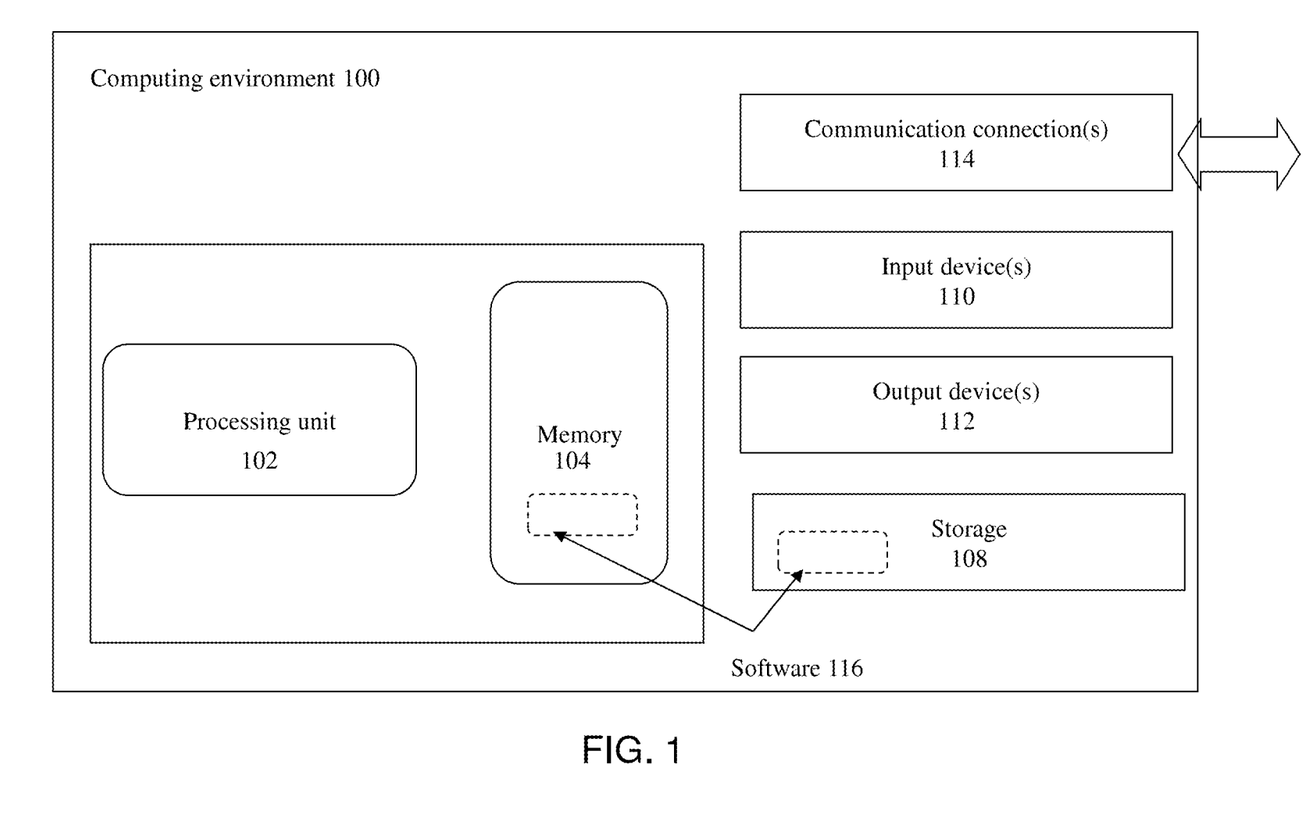
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments.

For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, mini-computers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
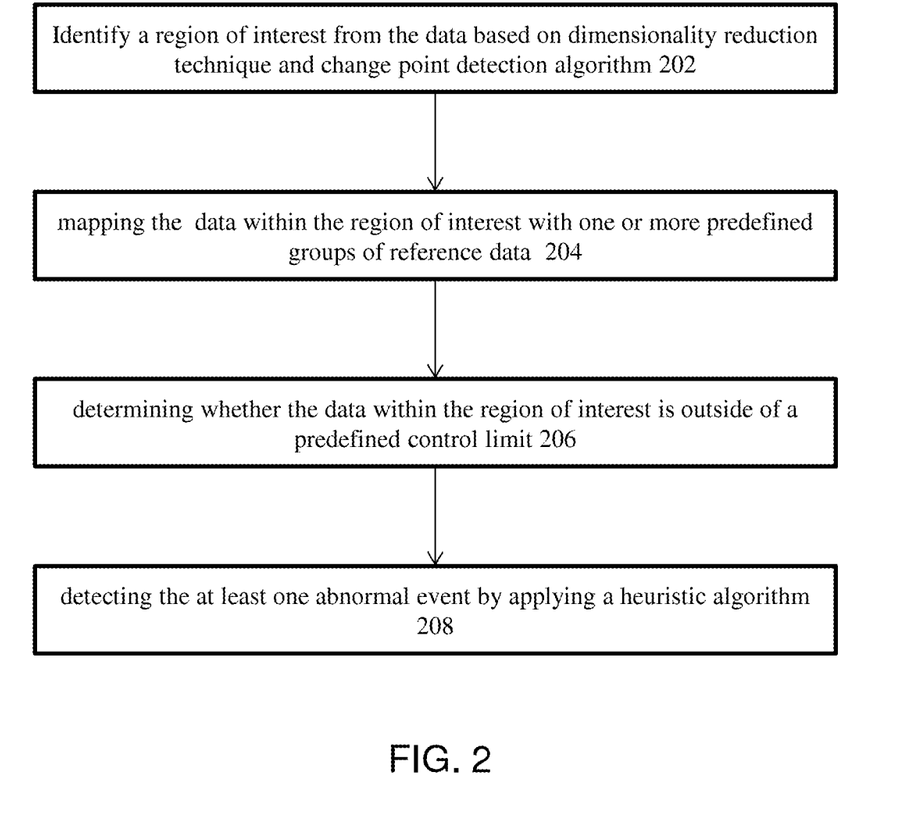
FIG. 2 is a flowchart, illustrating a method for data-driven anomaly detection if two data sets namely reference data and test data are available, in accordance with an embodiment of the present invention.

FIG. 2 is a flowchart, illustrating a method for data-driven anomaly detection if two data sets namely reference data and test data are available, in accordance with an embodiment of the present invention. In various embodiments of the present disclosure the reference data represent the normal condition of the system and test data represent abnormal condition of the system. In this disclosure the abnormal event satisfies the following condition:

a) the length of the abnormal run is >N data points (continuous);

b) an abnormal run occurs once and only once in the test data file;

c) the abnormal run does not occur in the reference data file.

In all the embodiments of the present disclosure the term "test data" is to be construed as "data" mentioned in the claims. A region of interest from the test data is identified based on dimensionality reduction technique and change point detection algorithm, as in step 202. The data or test data can be obtained from sensors attached to the system or from manual observation of the functioning of the system. In a preferred embodiment, the data is obtained from the sensors and this will be taken into consideration for describing the present technique but this is only for understanding purpose and does not intend to limit the scope of the disclosure. The data can be stored and extracted from a database or can be obtained from sensors directly in real time. The data may be preprocessed to remove incomplete and irrelevant data. The preprocessing step may include removing the entire column of sensor readings if the sensor readings of the corresponding column are entirely zero in both reference data and test data and/or removing the entire row of sensor readings at each time instance if the sensor reading of the corresponding row is entirely zero and/or removing the entire column of sensor reading if the sensor reading of the corresponding column is same in both the reference data and test data and/or removing the columns which are linearly dependent or correlated with other columns. The dimensionality reduction technique may include but is not limited to $T^2$ statistic. The $T^2$ statistic for the $i^{th}$ sampling time instance is calculated as follow:

$$T_i^2 = (S_j(i) - m_j) S^{-1} (S_j(i) - m_j)$$

Where,
$S_j(i)$ is the sensor reading for $j^{th}$ sensor at time instance i;
$m_j$ is the mean of sensor values over time for the $j^{th}$ sensor;
$S^{-1}$ is the inverse of standard covariance matrix using successive difference.

Covariance between sensor $j_1$ and $j_2$ is given by, $$S_{j_1 j_2} = \frac{1}{2(I-1)} \sum_{i=1}^{I} (S_{j_1}(i) - S_{j_1}(i-1))(S_{j_2}(i) - S_{j_2}(i-1))$$

Where,
I is the number of sampling time period and rest of the notations shall be construed as mentioned above.

Figure 4:
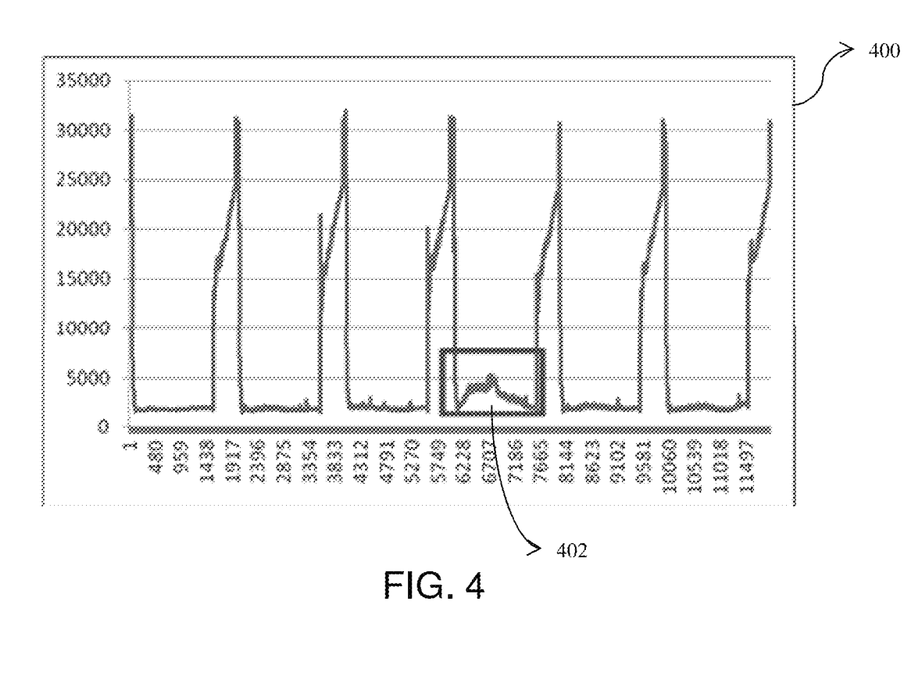
FIG. 4 is a plot of measure to identify the region of interest, in accordance with an embodiment of the present invention.

After computing $T^2$ Statistic for each time instance i, $T^2$-chart (in the y-axis) is plotted against sampling time (in the x-axis) to identify the region of interest using the Lavielle's change-point detection algorithm. FIG. 4 is a plot of measure to identify the region of interest, in accordance with an embodiment of the present invention and 402 in the figure shows the region of interest. In an alternate embodiment, the region of interest can be calculated from multi-modal pattern by using a statistic which is based on cumulative sums of differences from the mean. Steady increase in the obtained statistic indicates that the T-square statistic values are above the overall mean. Steady decrease in the obtained statistic indicates that the T-square statistic values are below the mean. The change in the pattern will be indicated by abrupt changes in the slope. Then the slope is computed for all pairs of peak and trough. The pair with farthest slope from the mean of all slopes will contain the region of interest. Hence, determine the region of interesting by finding out the pair of peak and trough for which slope is farthest away from the mean of all slopes.

Referring back to FIG. 2, the data within the region of interest is mapped with one or more predefined groups of reference data, as in step 204. The reference data can be obtained in the same way as the test data is collected. The reference data can be preprocessed like the test data and may be normalized by using any normalizing measure which may include but is not limited to mean and relative proportion. Then, an appropriate clustering technique is used based on the type of reference data to classify the reference data into different groups, wherein the said different groups represent one or more modes of operation of the system. In a preferred embodiment two types of clustering approaches are used namely, partition based clustering and hierarchical clustering. Based on the type of reference data the clustering algorithm is selected. For example, k-means and expectation maximization clustering algorithm is used if the data is continuous and if the data is categorical then robust clustering for categorical attributes is applied. A control limit is determined for each group of the reference data based on the type of the reference data. In a preferred embodiment, the central tendency and dispersion of each of the groups of reference data is measured. Measurement of central tendency and dispersion may include but are not limited to mean and standard deviation of each group of reference data. The overall mean vector is the mean sensor values over time for each sensor. The mean value can be calculated as follows:

$$m_j = \frac{\sum_{i=1}^{I} S_j(i)}{I} \; \forall \; j$$

Where,
$m_j$ is the mean of sensor values over time for the $j^{th}$ sensor;
i=index the sampling time;
I=number of sampling time period;
$s_j(i)$=Sensor reading for $j^{th}$ sensor at time instance I;
j=index the sensor number.

The standard deviation can be calculated as follows:

$$d_j = \sqrt{\frac{\sum_{i=1}^{I} (m_j - S_j(i))^2}{I - 1}} \; \forall \; j$$

Where,
$d_j$ is the standard deviation of sensor values over time for the $j^{th}$ sensor;
$m_j$ is the mean of sensor values over time for the $j^{th}$ sensor;
i=index the sampling time;
I=number of sampling time period;
$s_j(i)$=Sensor reading for $j^{th}$ sensor at time instance I.

The upper control limit and lower control limit of each group of the reference data can be obtained from the said mean and standard deviation. The upper control limit can be calculated as:

$$u_j = m_j + b \times d_j$$

Where,
$u_j$ is the upper control limit for sensor j;
$m_j$ is the mean of sensor values over time for the $j^{th}$ sensor;
$d_j$ is the standard deviation of sensor values over time for the $j^{th}$ sensor;
b is a constant. E.g. b=0.5, 1, 1.5, 2, 2.5, 3 and so on.

Similarly, the lower control limit can be determined as:

$$l_j = m_j - b \times d_j$$

Where, $l_j$ is the lower control limit for sensor j;
$m_j$ is the mean of sensor values over time for the $j^{th}$ sensor;
$d_j$ is the standard deviation of sensor values over time for the $j^{th}$ sensor;
b is a constant. E.g. b=0.5, 1, 1.5, 2, 2.5, 3 and so on.

The mapping in step 204 is done based on the closeness between the mean vector of each group of the reference data and the actual sensor reading of the test data.

In step 206 of FIG. 2 it is determined if the data or sensor readings within the region of interest of the test data fall outside of the said control limit. The sensor reading is flagged with −1, 0, and 1 for each scenario as follows: if the sensor reading is lying outside the lower control limit then the corresponding value is flagged with −1, else if the sensor reading is lying within the control limits then the corresponding value is flagged with 0, and if the sensor reading is lying outside the upper control limit then the corresponding value is flagged with 1. The resulting value can be called as flagged value. Similarly, the flagging is performed for the reference data set. Thereafter, the at least one abnormal event is detected by applying a heuristic algorithm, as in step 208. The data can be preprocessed before applying heuristic algorithm. The heuristic algorithm uses the flagged values to determine the anomaly or abnormal event. The flagged values are scanned to check whether candidate sensor(s) with different combination of sensor state (i.e. {−1, 0, +1}) results in an abnormal run in the region of interest of the test data. If it is an abnormal run (run longer than N time instances and the run occurring only once) then the candidate sensor(s) along with the respective sensor state can be referred as a pattern. Then, the reference data is scanned to check if the said pattern is also present in the reference data. If the pattern exists, then it is a normal event and can be discarded, else the pattern is stored as a candidate pattern as well as the start and end time of the abnormal event. The sensors also identified associated with the abnormal event by using the flagged values. The flagged values in the reference data are also analyzed to determine the longest streak of out of control limits event or abnormal event. The total time instance of longest streak is considered as the earliest detection time. If the candidate pattern has more than one abnormal sensor, then the latest start time among the abnormal run sensors is used as the earliest detection time. If the pattern appears in the reference data set then the run length of several runs (which does not satisfy the constraints of abnormal event) for that candidate pattern is identified. The earliest detection time is offset by a time period defined as a function of run length denoted by $f(r)$ or $f(m)$ as follows:

$$f(r) = \beta + \tau \times \delta$$

Where, r is the run length for the candidate pattern in the reference data;
β is the mean value of run length for the candidate pattern in the reference data:

$$\beta = \frac{\sum_{g=1}^{R} r_g}{R}$$

R is the total number of runs for the candidate pattern in the reference data;
τ is a constant;
∂ is the standard deviation among run length of candidate pattern in the reference data:

$$\delta = \sqrt{\frac{\sum_{g=1}^{R}(\beta - r)^2}{R - 1}}$$

$r_g$ is the run length of $g^{th}$ run for the candidate pattern in the reference data.

The offset time can be computed as a function of maximum run length if the cost of false alarming is not defined. The function $f(m)$ is defined as given below:

$$f(m) = \alpha \times \{\max(r_g)\}$$

Where, m is the maximum run length for the candidate pattern in the reference data;
α is the factor of safety;
$r_g$ is the run length of $g^{th}$ run for the candidate pattern in the reference data.

According to an embodiment of the present disclosure, an alert is generated for the users about the anomaly at the earliest and the results are consolidated to prepare a brief and detailed summary about the anomaly in the system.

Figure 3:
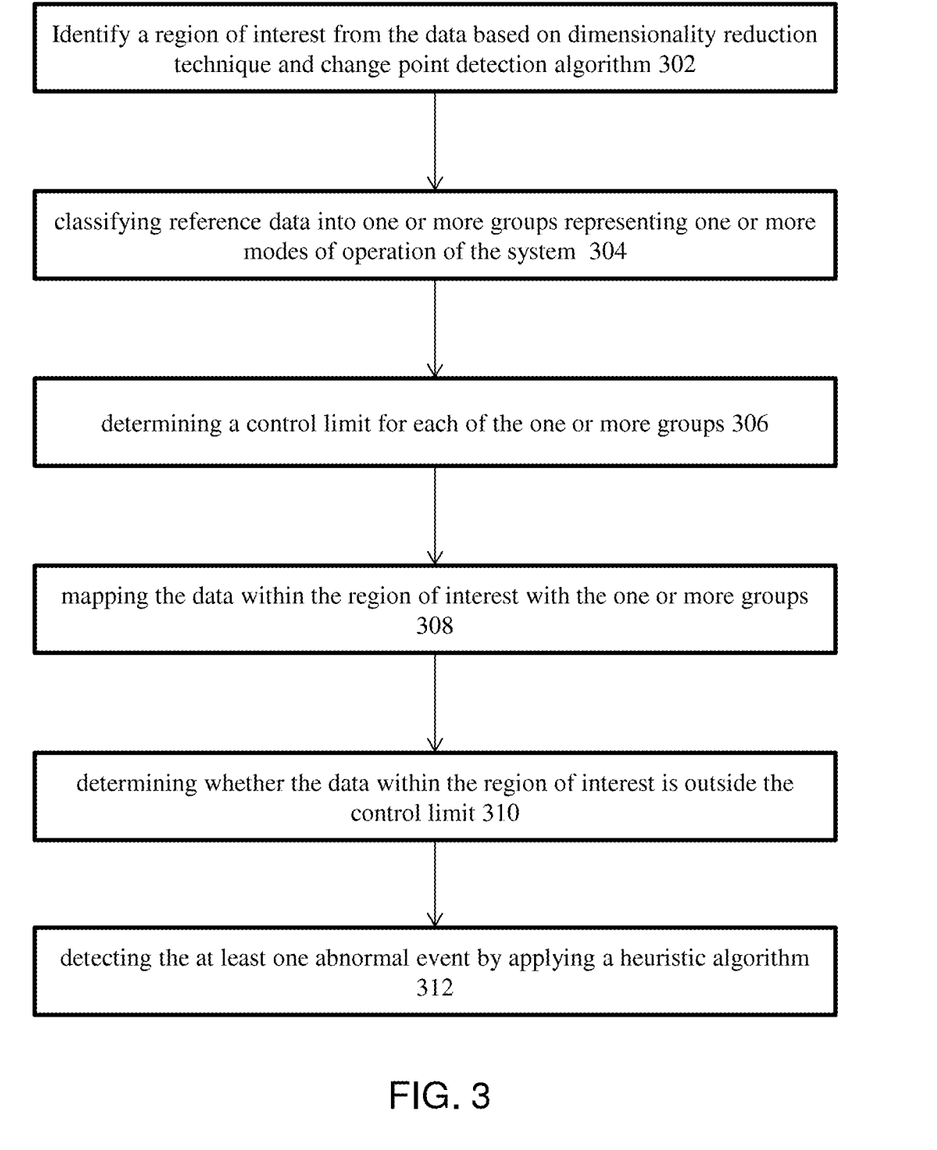
FIG. 3 is a flowchart, illustrating a method for data-driven anomaly detection if only test data is available, in accordance with an embodiment of the present invention.

FIG. 3 is a flowchart, illustrating a method for data-driven anomaly detection if only test data is available, in accordance with an embodiment of the present invention. A region of interest from the test data is identified based on dimensionality reduction technique and change point detection algorithm, as in step 302. In all the embodiments of the present disclosure the term "test data" is to be construed as "data" mentioned in the claims. The data or test data can be obtained from sensors attached to the system or from manual observation of the functioning of the system. In a preferred embodiment, the data is obtained from the sensors and this will be taken into consideration for describing the present technique but this is only for understanding purpose and does not intend to limit the scope of the disclosure. The data can be stored and extracted from a database or can be obtained from sensors directly in real time. The data may be preprocessed to remove incomplete and irrelevant data. The detail about the preprocessing of data is described hereinabove. The dimensionality reduction technique may include but is not limited to $T^2$ statistic. The details about computing $T^2$ statistic and identifying region of interest using change point algorithm is mentioned in detail herein above. The reference data can be obtained by removing the data points corresponding to the region of interest (RoI) from the test data. The reference data is classified based on the appropriate clustering technique into different groups, wherein the different groups represent different modes of operation of the system, as in step 304. The details about the clustering technique are provided herein above. A control limit for each of the said groups is determined, as in step 306. The details about the control limit determination are described herein above. The data within the region of interest are mapped with the said groups of the reference data based on the closeness between the mean vector of each group of the reference data and the actual sensor reading of the test data, as in step 308. In step 310, it is determined if the data or sensor readings within the region of interest of the test data fall outside of the said control limit. The sensor reading is flagged with −1, 0, and 1 for each scenario as follows: if the sensor reading is lying outside the lower control limit then the corresponding value is flagged with −1, else if the sensor reading is lying within the control limits then the corresponding value is flagged with 0, and if the sensor reading is lying outside the upper control limit then the corresponding value is flagged with 1. The resulting value can be called as flagged value. Similarly, the flagging is performed for the reference data set. Thereafter, the at least one abnormal event is detected by applying a heuristic algorithm, as in step 312. The description of the detection step is mentioned herein above in great detail. According with an embodiment of the present disclosure, the sensors also identified associated with the abnormal event by using the flagged values. The flagged values in the reference data are also analyzed to determine the earliest detection time of the abnormal event which is described in great detail herein above. An alert is also generated for the users about the anomaly at the earliest and the results are consolidated to prepare a brief and detailed summary about the anomaly in the system.

Figure 5:
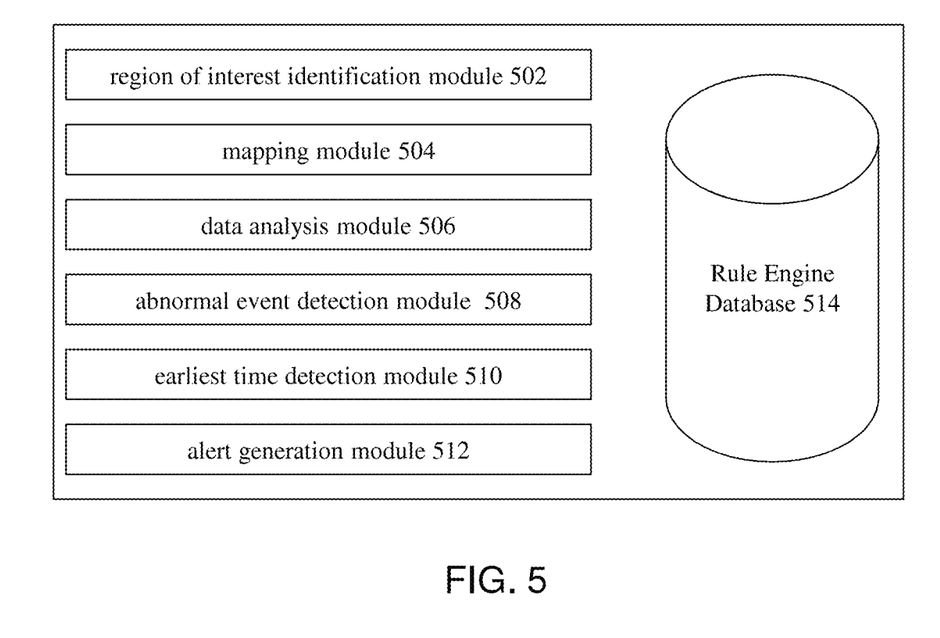
FIG. 5 is a block diagram illustrating a system for data-driven anomaly detection if two data sets namely reference data and test data are available, in accordance with an embodiment of the present invention.

FIG. 5 is a block diagram illustrating a system for data-driven anomaly detection if two data sets namely reference data and test data are available, in accordance with an embodiment of the present invention. The system includes region of interest identification module 502, mapping module 504, data analysis module 506, abnormal event detection module 508, earliest time detection module 510, alert generation module 512 and Rule Engine Database 514. The region of interest identification module 502 is configured to identify a region of interest from the data based on dimensionality reduction technique and change point detection algorithm. The dimensionality reduction technique may include but is not limited to $T^2$ statistic. The details about computing $T^2$ statistic and identifying region of interest using change point algorithm is mentioned in detail herein above. In all the embodiments of the present disclosure the term "test data" is to be construed as "data" mentioned in the claims. The data or test data can be obtained from sensors attached to the system or from manual observation of the functioning of the system. In a preferred embodiment, the data is obtained from the sensors and this will be taken into consideration for describing the present technique but this is only for understanding purpose and does not intend to limit the scope of the disclosure. The data can be stored and extracted from a database or can be obtained from sensors directly in real time. The data may be preprocessed to remove incomplete and irrelevant data. The detail about the preprocessing of data is described hereinabove. The mapping module 504 is configured to map the data within the region of interest with one or more predefined groups of reference data representing one or more modes of operation of a system, wherein the reference data represent normal operating condition of the system. An appropriate clustering technique is used based on the type of reference data to classify the reference data into different groups which is described in great detail herein above. As described above with reference to FIG. 2, a control limit is determined for each group of the reference data based on the type of the reference data. The data analysis module 506 is configured to determine whether the data within the region of interest is outside of the predefined control limit of the corresponding mapped group. The sensor reading is flagged with −1, 0, and 1 as described in detail herein above. The abnormal event detection module 508 is configured to detect at least one abnormal event by applying a heuristic algorithm on the data within the region of interest which are outside the control limit. The details about the abnormal event detection method are described herein above. According with an embodiment of the present disclosure, the sensors also identified associated with the abnormal event by using the flagged values. The earliest time detection module 510 is configured to determine an earliest detection time of the at least one abnormal event by identifying a pattern of abnormality in the data within the region of interest which are outside the control limit. The computing method of earliest detection time is described herein above in detail. The alert generation module 512 is configured to generate an alert on the occurrence of the at least one abnormal event. The Rule Engine Database 514 is configured to store predefined rules and rules given as an input by the user. The rules are segregated based on the different patterns exhibited by the sensors using the reference data. These rules are essential to identify the anomalies as well as to determine the earliest detection time.

Figure 6:
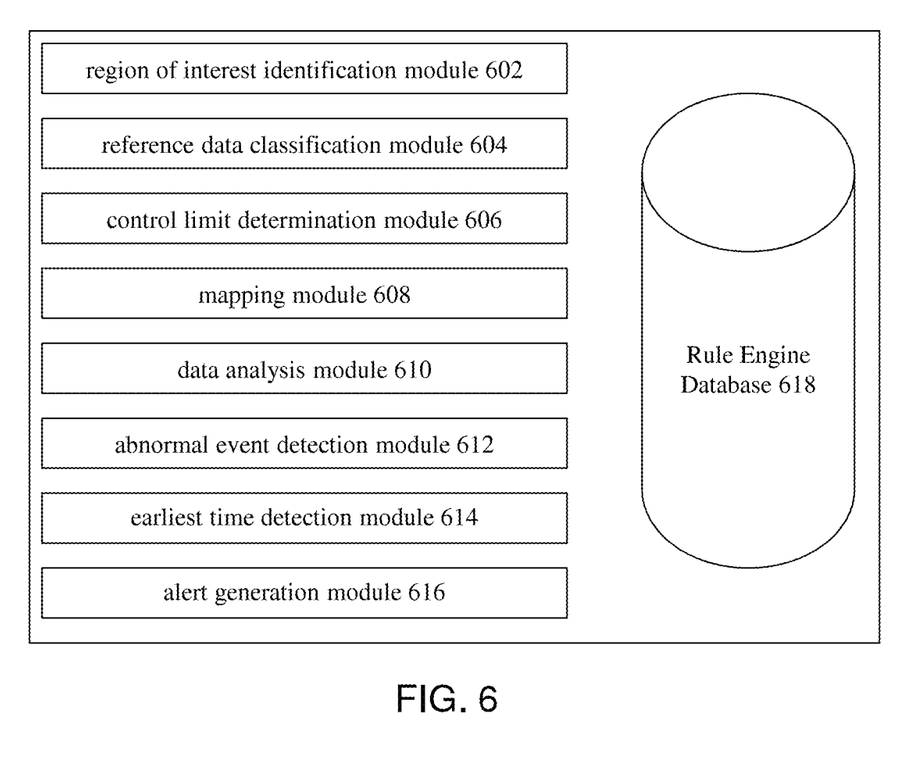
FIG. 6 is a block diagram illustrating a system for data-driven anomaly detection if only test data is available, in accordance with an embodiment of the present invention.

FIG. 6 is a block diagram illustrating a system for data-driven anomaly detection if only test data is available, in accordance with an embodiment of the present invention. The system includes region of interest identification module 602, reference data classification module 604, control limit determination module 606, mapping module 608, data analysis module 610, abnormal event detection module 612, earliest time detection module 614, alert generation module 616 and Rule Engine Database 618. The region of interest identification module 602 is configured to identify a region of interest from the data based on dimensionality reduction technique and change point detection algorithm. The dimensionality reduction technique may include but is not limited to $T^2$ statistic. The details about computing $T^2$ statistic and identifying region of interest using change point algorithm is mentioned in detail herein above. In all the embodiments of the present disclosure the term "test data" is to be construed as "data" mentioned in the claims. The data or test data can be obtained from sensors attached to the system or from manual observation of the functioning of the system. In a preferred embodiment, the data is obtained from the sensors and this will be taken into consideration for describing the present technique but this is only for understanding purpose and does not intend to limit the scope of the disclosure. The data can be stored and extracted from a database or can be obtained from sensors directly in real time. The data may be preprocessed to remove incomplete and irrelevant data. The detail about the preprocessing of data is described hereinabove. The reference data classification module 604 is configured to classify reference data into one or more groups representing one or more modes of operation of a system, wherein the reference data is obtained from a region outside the region of interest. The reference data is classified based on the appropriate clustering technique into different groups and the details about the clustering technique are provided herein above. The control limit determination module 606 is configured to determine a control limit for each of the one or more groups by analyzing the reference data. The details about the control limit determination are described herein above. The mapping module 608 is configured to map the data within the region of interest with the one or more groups based on the closeness between the mean vector of each group of the reference data and the actual sensor reading of the test data. The data analysis module 610 is configured to determine whether the data within the region of interest is outside the control limit of the mapped group. The sensor reading is flagged with −1, 0, and 1 as described above. The abnormal event detection module 612 is configured to detect at least one abnormal event by applying a heuristic algorithm on the data within the region of interest which are outside the control limit. The details about the abnormal event detection method are described herein above. According with an embodiment of the present disclosure, the sensors also identified associated with the abnormal event by using the flagged values. The earliest time detection module 614 is configured to determine an earliest detection time of the at least one abnormal event by identifying a pattern of abnormality in the data within the region of interest which are outside the control limit. The computing method of earliest detection time is described herein above in detail. The alert generation module 616 is configured to generate an alert on the occurrence of the at least one abnormal event. The Rule Engine Database 618 is configured to store predefined rules and rules given as an input by the user. The rules are segregated based on the different patterns exhibited by the sensors using the reference data. These rules are essential to identify the anomalies as well as to determine the earliest detection time.

One or more computer-readable media (e.g., storage media) or one or more processor-readable media (e.g., storage media) can comprise computer-executable instructions causing a computing system (e.g., comprising one or more processors coupled to memory) (e.g., computing environment 100 or the like) to perform any of the methods described herein. Examples of such computer-readable or processor-readable media include magnetic media, optical media, and memory (e.g., volatile or non-volatile memory, including solid state drives or the like).

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer-implemented method for data-driven anomaly detection, the method comprising:
    receiving, by a processor, a data set comprising data captured from one or more sensors monitoring an automated system;
    identifying, by the processor, a region of interest data subset of the input data set based on a dimensionality reduction technique and a change point detection algorithm, wherein the region of interest data subset has at least one different characteristic from remainder of the input data set;
    mapping, by the processor, the region of interest data subset to a predefined group of reference data representing normal sensor data of a mode of operation of the automated system, wherein the mapping is based on closeness between a mean vector of the predefined group of the reference data and the data points within the region of interest data subset;
    determining, by the processor, whether the data points within the region of interest data subset are outside of a predefined control limit of the corresponding mapped group; and
    detecting, by the processor, at least one abnormal event by applying a heuristic algorithm on the data points within the region of interest which are outside the control limit.

2. The method as claimed in claim 1 further comprising:
    determining an earliest detection time of the at least one abnormal event by identifying a pattern of abnormality in the data within the region of interest which are outside the control limit.

3. The method as claimed in claim 1, wherein the data is captured from the one or more sensors in real time.

4. The method as claimed in claim 1, wherein at least one of the one or more sensors is identified which corresponds to the data within the region of interest and falls outside of the control limit by applying the heuristic algorithm.

5. The method as claimed in claim 1, wherein the dimensionality reduction technique includes $T^2$ statistic.

6. The method as claimed in claim 1, wherein the one or more groups are classified based on one or more clustering algorithms.

7. The method as claimed in claim 1 further comprising:
    generating an alert on the occurrence of the at least one abnormal event.

8. A system for data-driven anomaly detection, comprising:
    a plurality of sensors monitoring an automated system;
    a processor in operable communication with a processor-readable storage medium, the processor-readable storage medium containing one or more programming instructions whereby the processor is configured to implement:
        a region of interest identification module configured to receive input data obtained from the plurality of sensors and identify a region of interest data subset from the input data based on a dimensionality reduction technique and a change point detection algorithm, wherein the region of interest data subset is a portion of the input data;
        a mapping module configured to map the region of interest data subset with one or more predefined groups of reference data representing one or more modes of operation of a system based on closeness between a mean vector of the respective one or more predefined groups of reference data and the data within the region of interest data subset, wherein the reference data represent normal operating conditions of the system;
        a data analysis module configured to determine whether the data points within the region of interest data subset are outside of a control limit calculated based on the corresponding mapped group of the one or more predefined groups, wherein the determination identifies if the data within the region of interest is below a lower control limit or above an upper control limit; and
        an abnormal event detection module configured to detect at least one abnormal event by applying a heuristic algorithm on the data points within the region of interest data subset which are outside the control limit.

9. The system as claimed in claim 8 further comprising:
    an earliest time detection module configured to determine an earliest detection time of the at least one abnormal event by identifying a pattern of abnormality in the data within the region of interest which are outside the control limit.

10. The system as claimed in claim 8, wherein the data captured from the plurality of sensors is preprocessed to remove incomplete data.

11. The system as claimed in claim 8, wherein at least one of the one or more sensors is identified which corresponds to the data within the region of interest and falls outside of the control limit by applying the heuristic algorithm.

12. The system as claimed in claim 8, wherein the dimensionality reduction technique includes $T^2$ statistic.

13. The system as claimed in claim 8, wherein, the one or more groups are classified based on one or more clustering algorithms.

14. The system as claimed in claim 8 further comprising:
an alert generation module configured to generate an alert on the occurrence of the at least one abnormal event.

15. A non-transitory computer-readable storage medium having computer-executable instructions stored thereon for data-driven anomaly detection, the instructions comprising:
instructions for identifying a region of interest data subset from input data captured from one or more sensors monitoring an automated system based on a dimensionality reduction technique and a change point detection algorithm, wherein the region of interest data subset is a data subset of the input data and is calculated at least in part from a multi-modal pattern via cumulative sums of differences from the mean of the input data;
instructions for mapping the region of interest data subset with at least one group of reference data from one or more predefined groups of reference data representing one or more modes of operation of a system based on closeness between a mean vector of the respective groups of reference data and the data points within the region of interest data subset, wherein the reference data represent normal operating conditions of the system;
instructions for determining whether the data points within the region of interest data subset are outside of a control limit of the corresponding mapped at least one group of reference data of the one or more predefined groups of reference data, wherein the determination identifies if the data points within the region of interest data subset are below a lower control limit or above an upper control limit as determined based on the data of the corresponding mapped at least one group of reference data; and
instructions for detecting at least one abnormal event by applying a heuristic algorithm on the data points within the region of interest data subset which are outside the control limit.

16. The non-transitory computer-readable storage medium as claimed in claim 15 further comprising:
instructions for determining an earliest detection time of the at least one abnormal event by identifying a pattern of abnormality in the data within the region of interest which are outside the control limit.

17. The non-transitory computer-readable storage medium as claimed in claim 15 further comprising:
instructions for generating an alert on the occurrence of the at least one abnormal event.

18. The non-transitory computer-readable storage medium as claimed in claim 15 further comprising:
instructions for consolidating results and preparing a summary about the at least one abnormal event.

19. The non-transitory computer-readable storage medium as claimed in claim 15, wherein if no reference data is available, then the one or more predefined groups of reference data is obtained from a region outside the region of interest of the data itself.

20. The non-transitory computer-readable storage medium as claimed in claim 15, wherein the dimensionality reduction technique is applied first to the data and then the change point detection algorithm is applied to the dimensionally-reduced data.

* * * * *